(12) United States Patent
Burton et al.

(10) Patent No.: US 6,327,322 B1
(45) Date of Patent: Dec. 4, 2001

(54) INTERLOCK ASSEMBLY FOR BURNABLE POISON ROD TRANSFER DEVICE

(75) Inventors: Christopher Marc Burton, Pittsburg; David John Stefko, Jeannette; Louis Joseph Tylman, Trafford, all of PA (US)

(73) Assignee: Westinghouse Electric Company LLC, Pittsburgh, PA (US)

( * ) Notice: Subject to any disclaimer, the term of this patent is extended or adjusted under 35 U.S.C. 154(b) by 0 days.

(21) Appl. No.: 09/362,004

(22) Filed: Jul. 27, 1999

(51) Int. Cl.[7] .................................................. G21C 19/10
(52) U.S. Cl. .......................... 376/262; 376/233; 376/327; 376/333; 376/260; 294/86; 294/90
(58) Field of Search ..................................... 376/260, 262, 376/327, 333, 233; 294/86.29, 115, 906

(56) References Cited

U.S. PATENT DOCUMENTS

| | | | |
|---|---|---|---|
| 3,857,599 | * 12/1974 | Jones et al. .............................. | 294/90 |
| 3,967,741 | * 7/1976 | Hoffmeister ........................... | 214/27 |
| 4,279,699 | * 7/1981 | Kuhn ..................................... | 376/268 |
| 4,311,557 | * 1/1982 | Kowalski et al. .................... | 376/271 |
| 4,382,711 | * 5/1983 | Lafosse et al. ....................... | 403/290 |
| 4,481,164 | * 11/1984 | Bollinger ............................... | 376/233 |
| 4,752,434 | * 6/1988 | Savary .................................. | 376/233 |
| 4,778,645 | * 10/1988 | Altman et al. ........................ | 376/260 |
| 4,820,475 | * 4/1989 | Mayers et al. ........................ | 376/327 |
| 5,128,095 | * 7/1992 | Limouzin ............................... | 376/271 |
| 5,227,125 | 7/1993 | Beneck et al. . | |
| 5,325,408 | * 6/1994 | Hornak et al. ........................ | 376/260 |
| 5,570,399 | * 10/1996 | Sakamaki .............................. | 376/260 |
| 5,600,685 | * 2/1997 | Izzo et al. ............................. | 376/260 |

FOREIGN PATENT DOCUMENTS

| | | | |
|---|---|---|---|
| 0742649 | * 2/1970 | (BE) . | |
| 2615 649 A | * 11/1988 | (FR) ............................... | G21C/19/32 |
| 2086839 A | * 5/1982 | (GB) ............................... | B66C/1/44 |
| 0137889 | * 8/1984 | (JP) . | |
| 0012560 | * 3/1988 | (JP) ............................... | G21C/19/34 |
| 6 3079097 | * 4/1988 | (JP) ............................... | G21C/19/19 |

\* cited by examiner

*Primary Examiner*—Charles T. Jordan
*Assistant Examiner*—J. Richardson

(57) ABSTRACT

A transfer device for moving a poison rod assembly between fuel cells in a nuclear fuel storage facility coupleable to an overhead crane. The poison rod assembly has a plurality of poison rods disposed in rows. The device includes an elongated outer member, an inner member, and a gripper assembly supported by the inner member. The inner member is slidably disposed within the elongated outer member. The overhead crane is coupled to the inner member for sliding said inner member between an upper position and a lower position. An interlock assembly selectively couples the inner member and elongated outer member. Thus, moving the crane, which is coupled to the inner member either moves the inner member relative to the elongated outer member when the interlock is not engaged, or, moves both the inner member and the elongated outer member when the interlock is engaged.

14 Claims, 15 Drawing Sheets

INTERLOCK ASSEMBLY FOR BURNABLE POISON ROD TRANSFER DEVICE

CROSS REFERENCE TO RELATED APPLICATION

This application is related to commonly owned, concurrently filed patent application Ser. No. 09/362,005, "SLIDABLE COMB ASSEMBLY FOR BURNABLE POISON ROD TRANSFER DEVICE."

BACKGROUND OF THE INVENTION

1. Field of the Invention

This invention relates to a device for transporting poison rod assemblies between fuel assemblies in a nuclear fuel storage facility and, more specifically, to a device for transferring a poison rod assembly which uses an overhead crane as its only lifting mechanism.

2. Description of the Prior Art

Fuel for a nuclear reactor used to create steam and, ultimately, electricity, generally is in the form of fuel rods containing a fissile material. When fuel rods are being stored, the fuel rods are typically supported in nuclear fuel assemblies arranged as spaced parallel arrays. Fuel assemblies are stored in racks in a protective medium, such as water containing boric acid. In addition to the fuel rods, poison rods are disbursed throughout the fuel assemblies to control the fission process. Poison rods generally include a plurality of elongated rods, each containing a neutron absorbent material, which fit in longitudinal openings, or thimbles, defined in the fuel assemblies. The top end of each poison rod is attached to a web thereby forming a poison rod assembly. A T-shaped bar is affixed to the top of the web, creating an easily accessible handle for lifting the poison rod assembly so that it may be transferred from one fuel assembly to another.

As shown in Hornak et al., U.S. Pat. No. 5,325,408, prior art transfer devices use a winch located at the top of the transfer device to lift the poison rod assembly. Movement of the transfer device itself between fuel cells, is accomplished by a gantry crane in the fuel cell storage facility. Thus, prior art lifting devices consist of at least two lifting means, one to lift the transfer device itself, and one to lift the poison rod assembly within the transfer device. Lifting of a poison rod assembly could be performed more efficiently by the crane used to move the transfer device. Additionally, elimination of the winch would reduce the cost of the transfer device and eliminate unnecessary parts that are subject to mechanical failure.

Therefore, there is a need for a poison rod transfer device that does not require the use of a winch.

There is a further need for a poison rod transfer device that uses a single lifting mechanism to remove the poison rod assembly from a fuel cell and transfer it to another fuel cell.

SUMMARY OF THE INVENTION

The present invention satisfies the above referenced needs and others by providing a poison rod assembly transfer device having a poison rod assembly lifting device which may be actuated by the overhead crane used to move the transfer device.

Lifting of the poison rod assembly is accomplished by a lifting assembly coupled to the overhead crane. The lifting assembly consists of an elongated outer member, an inner member, a gripper, assembly and an interlock device. The crane is attached to the top of the inner member. The gripper assembly is connected to the bottom of the inner member. The inner member is slidably disposed within the elongated outer member. The elongated outer member is seated on the fuel cell from which the poison rod assembly will be lifted. When the interlock device is not engaged, raising or lowering the crane will slide the inner member within the elongated outer member between an upper locked position and a lower locked position. When the interlock is engaged, the inner and elongated outer members are coupled so that the inner member cannot slide within the elongated outer member and raising the crane will lift the entire transfer device. Thus, when the interlock is not engaged the crane may lift a poison rod assembly out of the fuel cell, when the interlock is engaged the crane will lift the entire transfer device. Accordingly, only a single lifting mechanism is required.

The interlock device utilizes a pair of releasable latch members which pass through openings in the outer and inner members. The interlock device is designed to automatically lock the inner member in place each time the inner member is brought to the upper position. The interlock device is also designed to automatically lock the inner member in place when brought into the lower position if the gripper is not engaged with a poison rod assembly. When the gripper has engaged a poison rod assembly, a shield device prevents the interlock device from operating. Thus, when the inner member is in its lower position and the gripper has engaged a poison rod assembly, the inner member will not be locked in the lower position and, therefore, can be lifted without the operator having to release the interlock, thus simplifying the lifting operation.

Typically, removal of a poison rod assembly will begin with the inner member locked in the lower position. When the inner member is locked in the lower position, the gripper is located near the bottom of the outer member. After the transfer device is seated on a fuel cell, the operator will release the interlock allowing the gripper to be lowered further to engage the T-bar on the poison rod assembly. When the gripper is rotated into the latched position, the shield device is engaged and will prevent the interlock device from reengaging when the inner member reaches the lower position. When the operator raises the overhead crane without the interlock engaged, the inner member slides vertically within the outer member, lifting the poison rod assembly out of the fuel cell. When the inner member reaches the upper position, the interlock device engages, preventing the inner member and poison rod assembly from moving relative to the outer member. At this point, as the crane continues to lift, the entire transfer device will be lifted off the fuel cell.

When the transfer device is seated on another fuel cell, the operator can only lower the poison rod assembly by releasing the interlock device. When the interlock device is released, the inner member and poison rod assembly may move vertically relative to the outer member. When the crane is lowered, the inner member slides downwardly in the outer member as the poison rod assembly is lowered into the new fuel cell. When the poison rod assembly is seated within the fuel cell, the operator may unlatch the gripper, thereby also disengaging the shield device. When the inner member is raised to the lower position, the interlock assembly once again locks the inner member in the lower position. When the crane is raised, the entire device will lift with the inner member locked into the lower position.

BRIEF DESCRIPTION OF THE DRAWINGS

An understanding of the invention can be gained from the following description of the preferred embodiment when read in conjunction with the accompanying drawings.

FIG. 3 is a diagram showing the inner member in various positions. Specifically.

FIG. 4 is an elevational view of the lower end of the transfer device. Specifically.

FIG. 5 is a cross-sectional view taken along line 5—5 in FIG. 4a.

FIG. 7 is a detail of the interlock device. Specifically.

FIG. 12 is a diagram of the interlock device. Specifically.

FIG. 14 is a view taken along line 14—14 of FIG. 12.

DESCRIPTION OF THE PREFERRED EMBODIMENT

Figure 1:
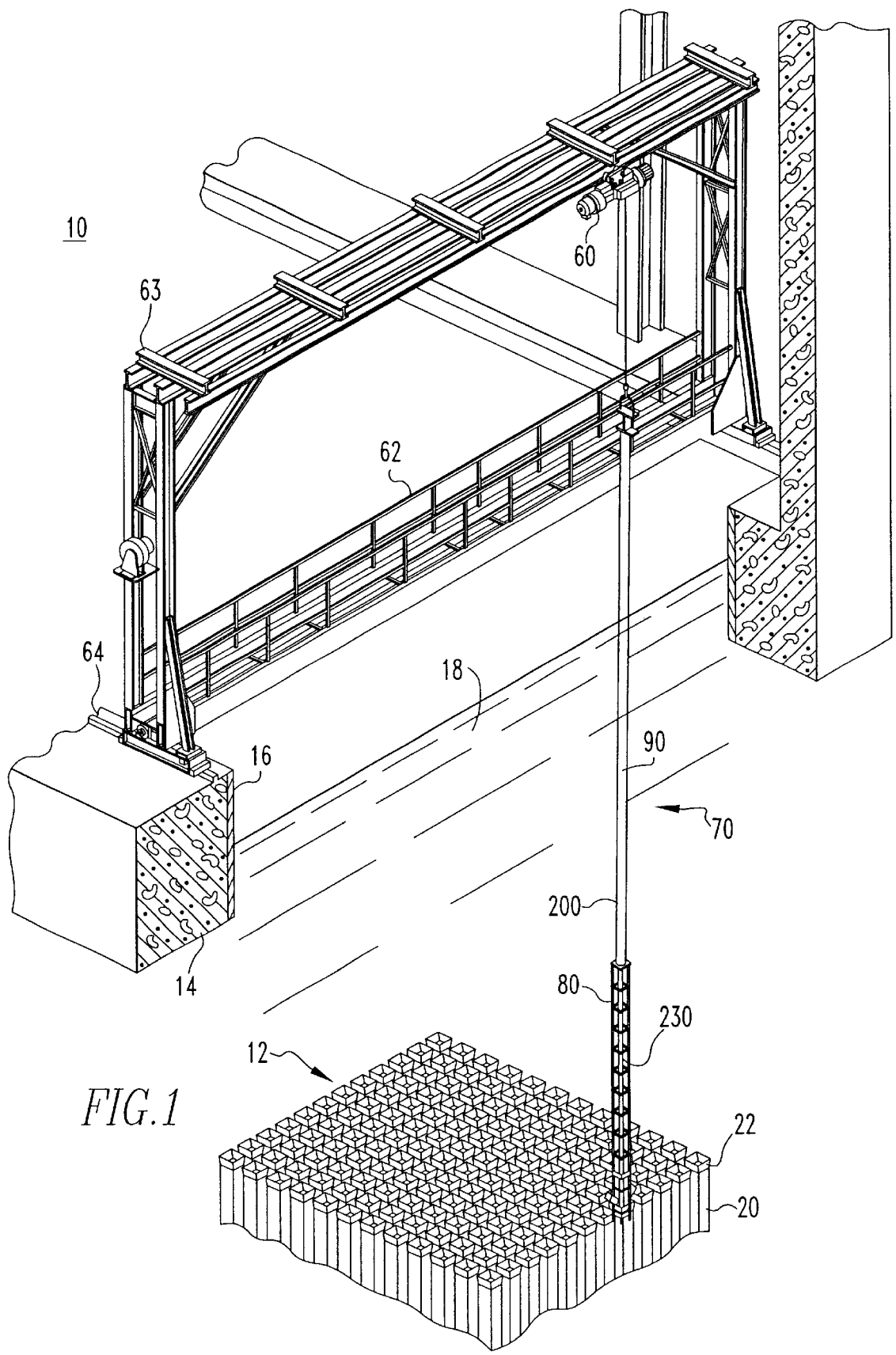
FIG. 1 is a perspective view of a nuclear fuel storage pit.
Figure 2:
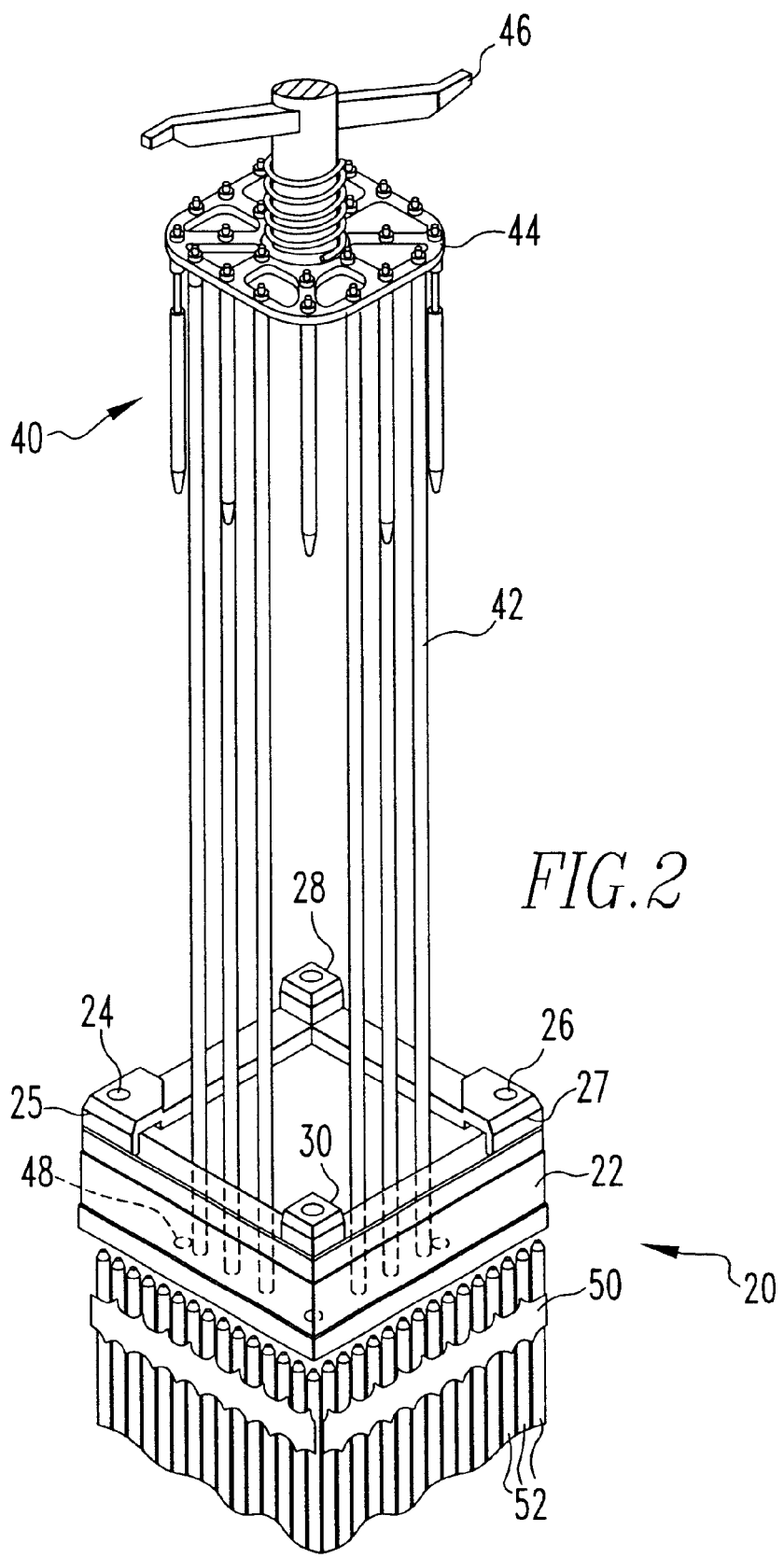
FIG. 2 is a perspective view of a poison rod assembly partially withdrawn from a fuel cell.

Referring to FIG. 1, there is illustrated a spent fuel pit 10 which contains a plurality of spent nuclear fuel racks 12. The pit 10 is a sealed enclosure comprised of concrete 14 and a sealed metallic liner 16. The spent fuel pit 10 is filled with a shielding medium, such as water containing boric acid 18. Each fuel rack 12 includes a plurality of vertically oriented spaced apart fuel cells 20. Each cell 20 is sized to receive a fuel assembly 50 (described below). Each cell 20 has a metallic can 22 affixed to the top of the cell 20. The can 22 may include a square funnel to guide a fuel assembly 50 into its storage position. As shown in FIG. 2, the can 22 includes two bores 24, 26 in raised plates 25, 27 at diagonally opposite corners. The remaining corners of the can 22 define standoff plates 28, 30.

Referring to FIG. 2, a poison rod assembly 40 is shown partially extracted from a fuel cell 20. Each fuel assembly 50 is formed in part from fuel rods 52 which are intermixed with poison rods 42. The fuel rods 52 are generally positioned on the periphery of the fuel assembly 50 and the poison rods 42 are generally positioned in an inner portion of the fuel assembly 50. The poison rods 42 are joined at their top portions by a support web 44. A T-shaped bar 46 is attached to the support web 44 extending upwardly, forming an easily accessible handle for lifting the poison rod assembly 40. When the poison rod assembly 40 is positioned within the fuel assembly 50, each poison rod 42 is disposed within a thimble 48 mounted in the fuel assembly 50.

Referring to FIG. 1, a poison rod assembly transfer device 70 of the present invention is illustrated within a spent fuel pit 10. The transfer device 70 is suspended within the spent fuel pit 10 by an overhead crane 60. The overhead crane 60 is coupled to a moveable walkway 62 and gantry 63. The moveable walkway 62 and gantry 63 are mounted on walkway rails 64 located above the water line 18 of the spent fuel pit 10. The crane 60, moveable walkway 62 and gantry 63 are used to lift the transfer device 70 and a poison rod assembly 40 and move them between fuel cells 20. The transfer device 70 is seated on a fuel cell 20 and attached to a poison rod assembly 40 as detailed below.

Figure 3A:
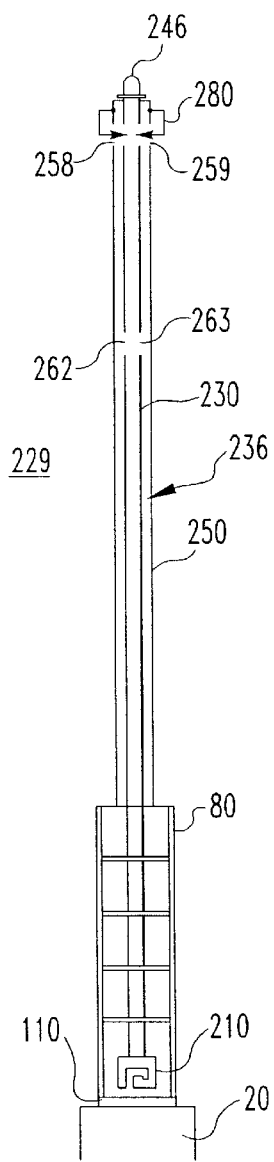
FIG. 3a shows the inner member in the lower position.
Figure 3B:
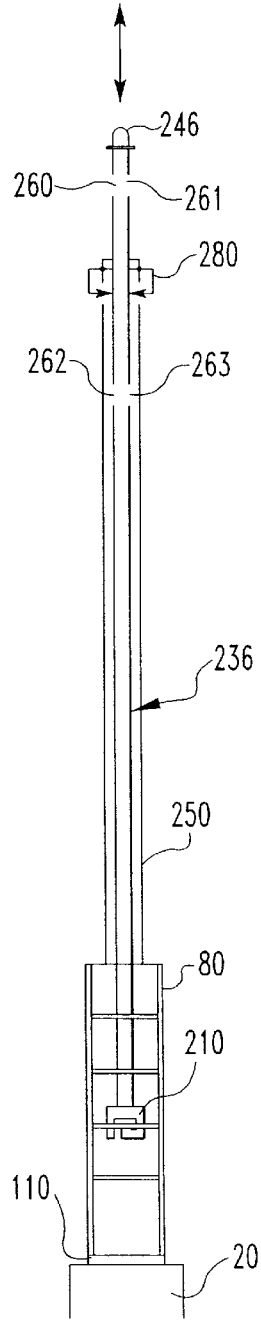
FIG. 3b shows the inner member in an intermediate position.
Figure 3C:
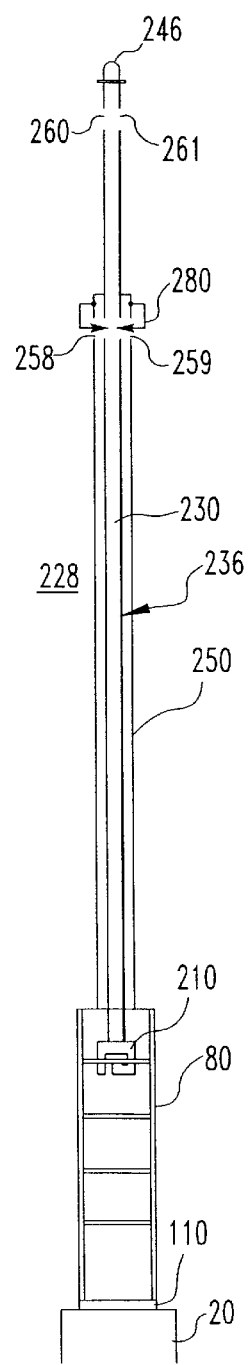
FIG. 3c shows the inner member in the upper position.

The transfer device 70 includes an elongated outer member 200, and an inner member 230 slidably disposed within the elongated outer member 200. In the preferred embodiment, the elongated outer member 200 will have two distinct portions, an upper portion 90 and a frame assembly 80. The frame assembly 80 supports and protects the poison rod assembly 40 as it is extracted from fuel cell 20. In the preferred embodiment, the upper portion 90 is tubular. The frame assembly 80 is fixed below the upper portion 90. The frame assembly 80 and the upper portion 90 are of an appropriate length so that the top of the upper portion 90 is adjacent to the walkway 62 when the transfer device 70 is seated on a fuel cell 20. As shown diagrammatically in FIG. 3, the upper portion includes outer member 250. Inner member 230 is slidably disposed within the outer member 250 and frame 80, and is coupled with a gripper assembly 210. Gripper assembly 210 is disposed within the elongated outer member 200 and partially disposed within the inner member 230. The gripper assembly 210 includes a gripper 212 disposed within the frame 80. The inner member 230 and outer member 250 can be selectively coupled by an interlock device 280. The interlock device 280 locks the inner member 230 in either an upper position 228 as shown in FIG. 3c or a lower position 229 as shown in FIG. 3a. The inner member 230 is attached to the crane 60 so that, when the inner member 230 is not coupled to outer member 250 and the crane 60 is raised, frame 80 and outer member 250 remain stationary and inner member 230 and gripper assembly 210 move vertically. When the interlock device 280 is engaged, however inner member 230 is coupled to outer member 250 and raising the crane 60 raises the entire transfer device 70.

Thus, lifting of a poison rod assembly 40 is accomplished by an operator using crane 60 to position the transfer device 70 over a fuel cell 20 containing a poison rod assembly 40. Once the transfer device 70 is seated on the fuel cell 20, the operator uses crane 60 to lower inner member 230 and gripper assembly 210 until the gripper assembly 210 engages the T-bar 46 of the poison rod assembly 40. When the gripper assembly 210 has engaged the T-bar 46, the operator uses crane 60 to lift the inner member 230, gripper assembly 210 and the poison rod assembly 70. Once the poison rod assembly 40 is withdrawn from fuel cell 20, the operator may use the moveable gantry 63 to reposition the crane 60 and transfer device 70 above another fuel cell 20. The transfer device 70 is seated on the second fuel cell 20 and the poison rod assembly 40 can be inserted into the second fuel cell 20. When the poison rod assembly 40 is seated within the second fuel cell 20, the gripper assembly 210 is disengaged from the poison rod assembly 40 and the transfer device 70 removed.

Figure 4A:
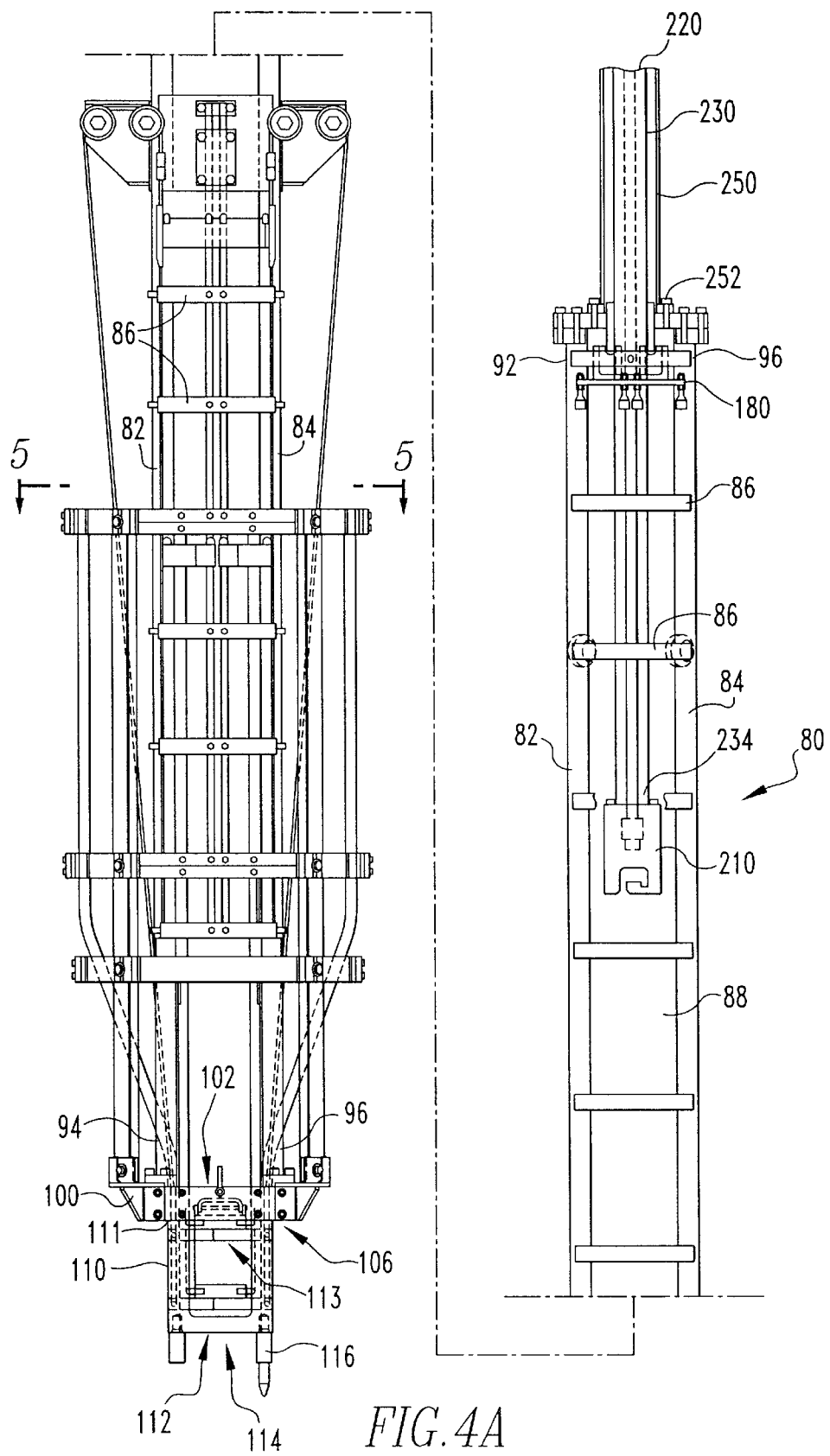
FIG. 4a shows the gripper assembly in the upper position.
Figure 4B:
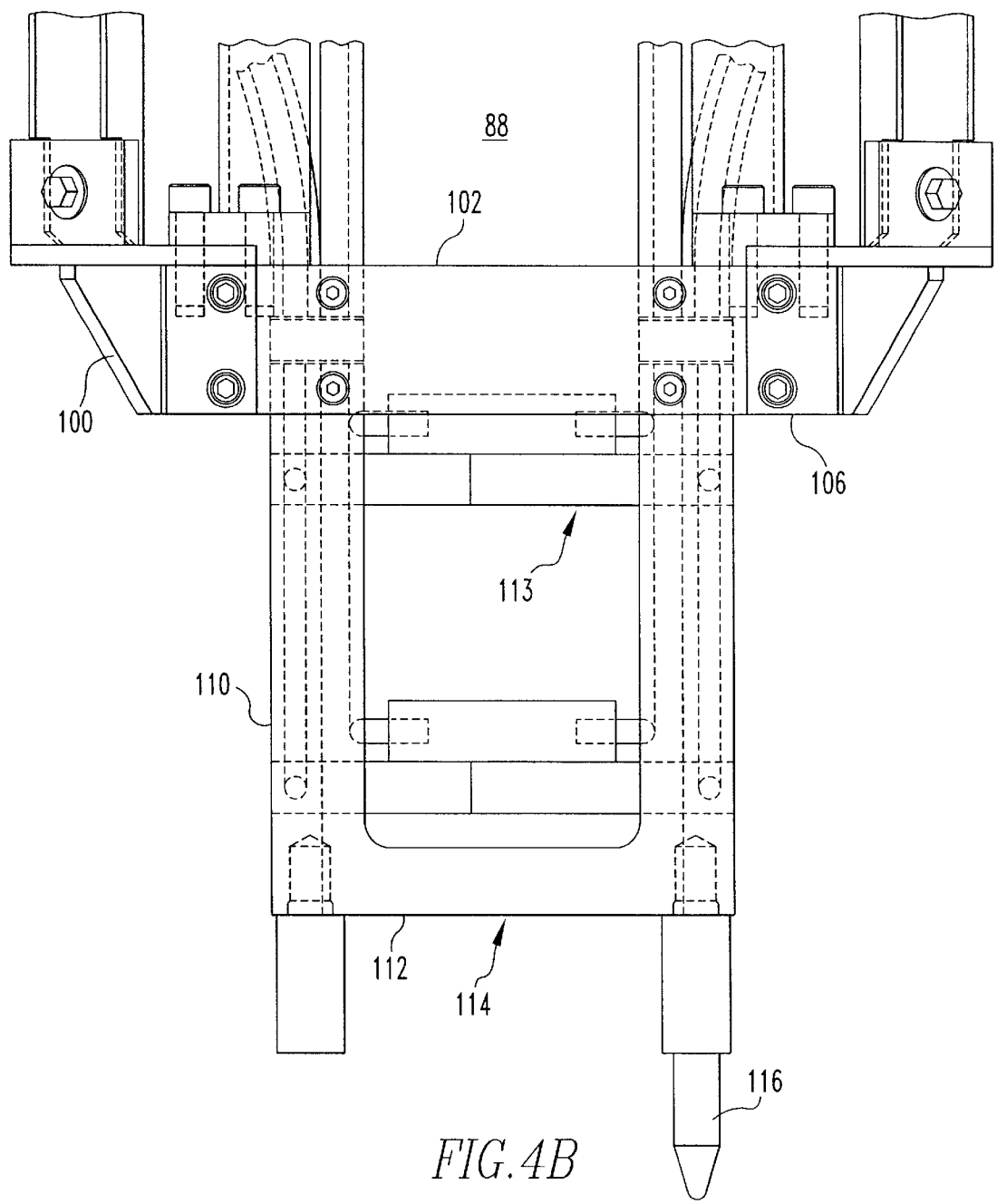
FIG. 4b is a detail of the lower end of the transfer device.
Figure 5:
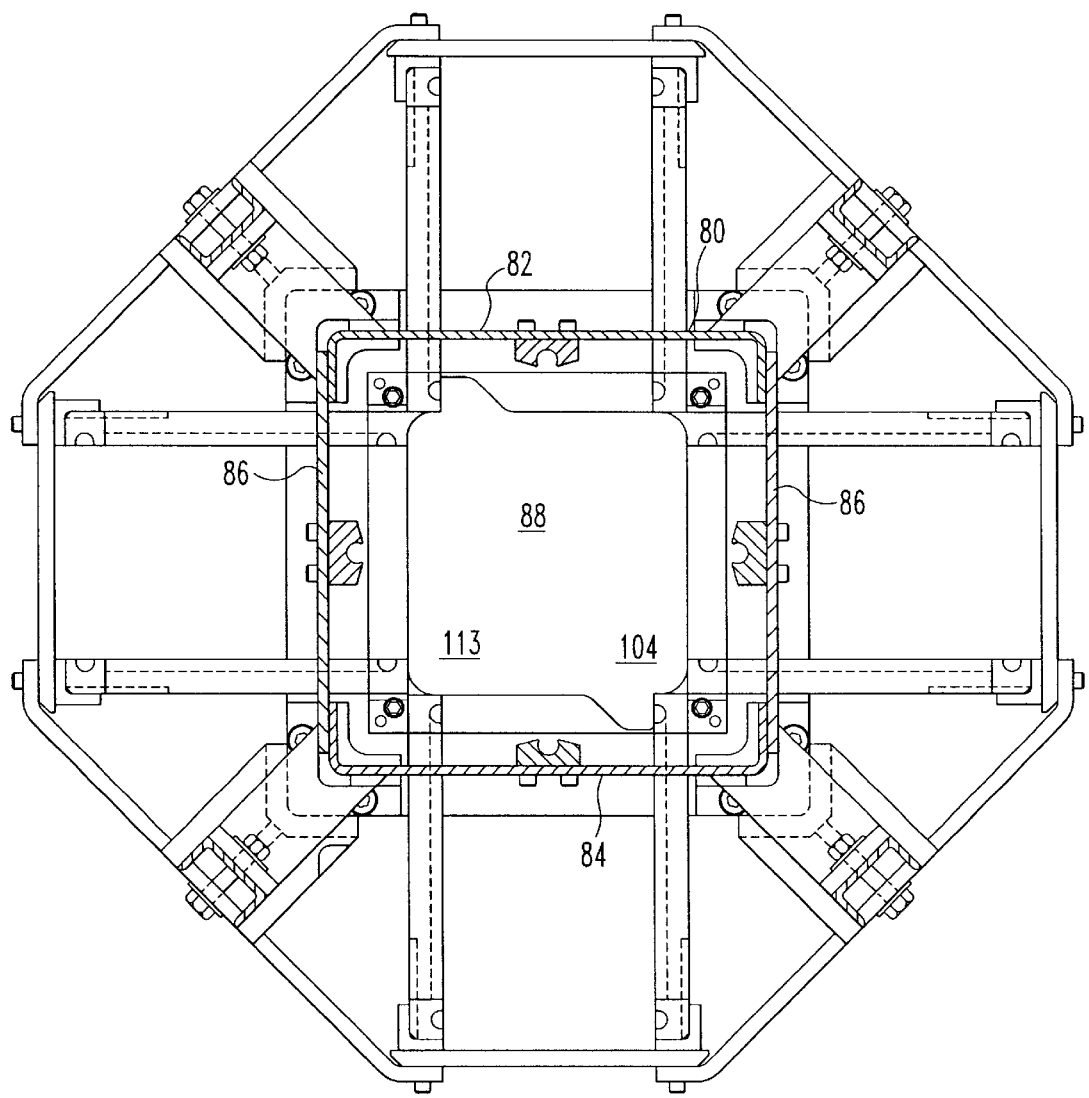

As shown in FIG. 4a, 4b, and 5, the frame assembly 80 includes two C-members 82, 84 held in spaced relation by a plurality of braces 86. The C-members 82, 84 define a, preferably square, frame cavity 88. Each C-member 82, 84 has an upper end 92, located at frame assembly upper end 91, and a lower end 94, 96 located at frame assembly lower end 95. At the lower end 94, 96 of the C-members 82, 84 is a mounting plate 100. Mounting plate 100 has an upper surface 102, an opening 104 and a lower surface 106. The C-members 82, 84 are attached to the mounting plate upper surface 102. The mounting plate opening 104 communicates with the frame cavity 88.

The frame assembly 80 further includes a square pedestal 110 attached to the mounting plate lower surface 106. The pedestal 110 is a four-sided structure having an upper surface 111, a lower surface 112 with openings 113, 114 therethrough. The upper surface pedestal opening 113 and lower surface pedestal opening 114 are sized to allow the poison rod assembly 40 to pass therethrough. The upper surface pedestal opening 113 communicates with the mounting plate opening 104. In operation, the poison rod assembly 40 will be lifted through the pedestal 110 and mounting plate 100 by gripper assembly 210 into a position within the frame cavity 88. The pedestal lower surface 112 has at least one projection 116. In the preferred embodiment there are two pedestal projections 116 extending downwardly from diagonally opposite corners. The projection 116 are sized to engage the bore holes 24, 26 on the fuel rod assembly can 22. Thus, seating the transfer device 70 as a fuel cell 20 is accomplished by the operator lowering the device 70 until projection 116 are seated within bore holes 24, 26. Once the projection 116 are so seated, the transfer device 70 is resting on the fuel cell 20.

Outer member 250 is fixed at its lower end 252 to frame 80. Thus, when the transfer device 70 is seated on a fuel cell 20, frame 80 and, therefore outer member 250, are fixed in place. As noted above, inner member 230 is slidable disposed within outer member 250. Thus, as shown in FIG. 3, when frame 80 and outer member 250 are fixed in place, inner member 230 can slide between an upper position 228 and a lower position 229 within outer member 250 and frame 80.

Figure 6:
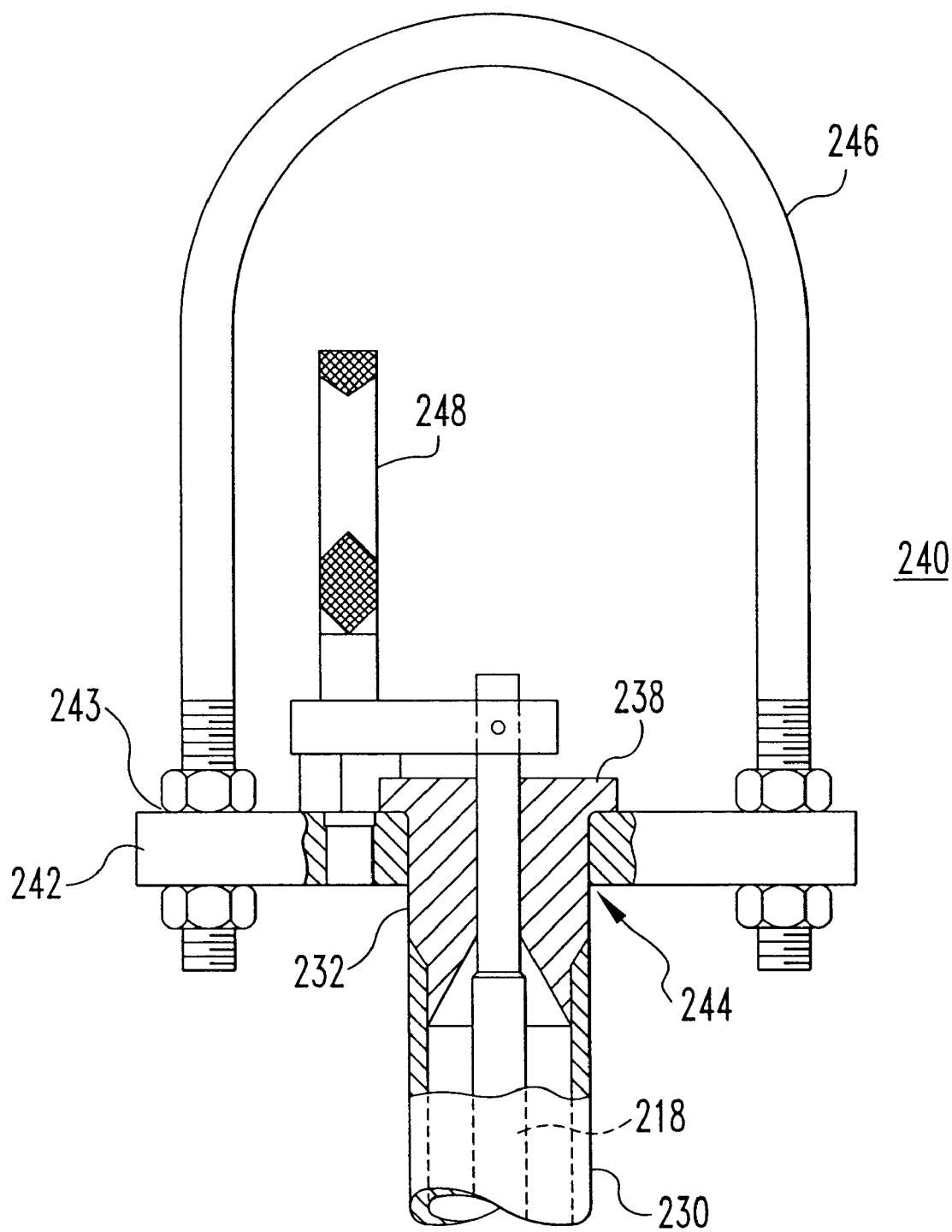
FIG. 6 is an elevational view of the lifting platform.

As shown in FIG. 6, a platform 240 is mounted at the upper end 232 of inner member 230. The lifting platform 240 includes a plate 242 having an upper surface 243, a medial hole 244 therethrough and a lifting bail 246 disposed above the plate 242. The inner member 230 passes through medial hole 244 and has a flange 238 that contacts plate upper surface 243. The crane 60 is attached by conventional means to the bail 246. Thus, raising or lowering inner member 230 or transfer device 70 is accomplished through the crane 60 acting on platform 240.

As shown in FIGS. 3, 7a, 7b and 8, the interlock device 280 allows the inner member 230 to be locked in either the upper position 228 or the lower position 229. In the upper position 228, the inner member 230 is raised so that the gripper assembly 210 is adjacent to the top of frame 80. In the lower position 229, the gripper assembly 210 is adjacent to the lower end of frame 80, but spaced above pedestal 110. When the inner member 230 is in either locked position 228, 229, raising or lowering the crane 60 will lift or lower the transfer device 70. When the interlock device 280 is in an unlocked position, raising or lowering the crane 60 will slide the inner member 230 between the upper position 228 and the lower position 229 as shown in FIG. 3b or allow the gripper assembly 210 to be lowered to engage a poison rod assembly 40.

The interlock device 280 is located adjacent to the upper end 254 of outer member 250. When the transfer device 70 is seated on a fuel cell 20, the interlock device 280 is positioned adjacent to the walkway 62 where it may be reached by the operator. The interlock device 280 includes a pair of latch members 290, 291, and a release mechanism 300 which includes support collar assembly 301, linking members 282, 283, a double clevis 284, push rod 286, spring 288, and interlock support plate 289. Additionally, outer member 250 has two openings 258, 259, spaced one hundred and eighty degrees apart, located adjacent to the interlock device 280. Finally, inner member 230 has an upper pair of openings 260, 261 and a lower pair of openings 262, 263 each spaced one hundred and eighty degrees apart. The upper openings 260, 261 are located proximal to the upper end of member 230 and the lower openings 262, 263 are spaced approximately 13–15 feet (just over the length of the poison rod assembly) below the upper openings 260, 261. As will be detailed below, spring 288, cooperating with linking members 282, 283 and push rod 286, urge latch members 290, 291 to pass through the outer member openings 258, 259 and either the upper or lower inner member openings 260, 261, 262, 263 whereupon the inner member 230 will be locked in place relative to the outer member 250.

Figures 7A, 7B:
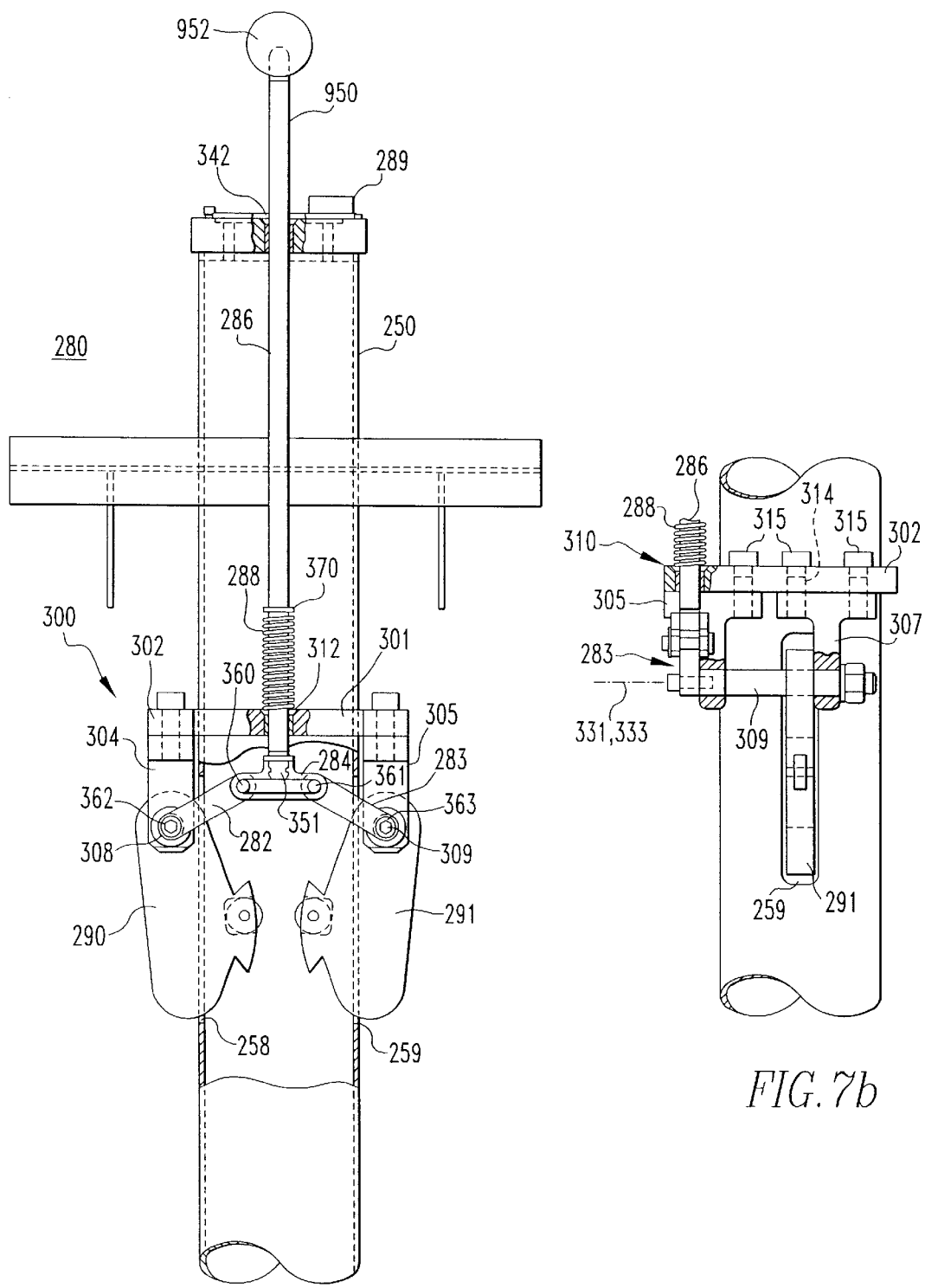
FIG. 7a is a front elevational view.
FIG. 7b is a side elevational view.
Figure 9:
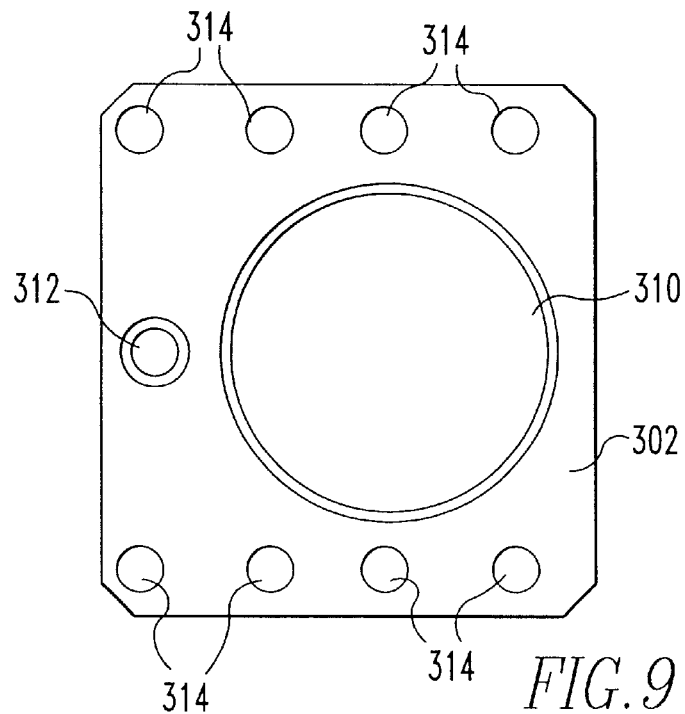
FIG. 9 is a top view of the collar plate.
Figure 10:
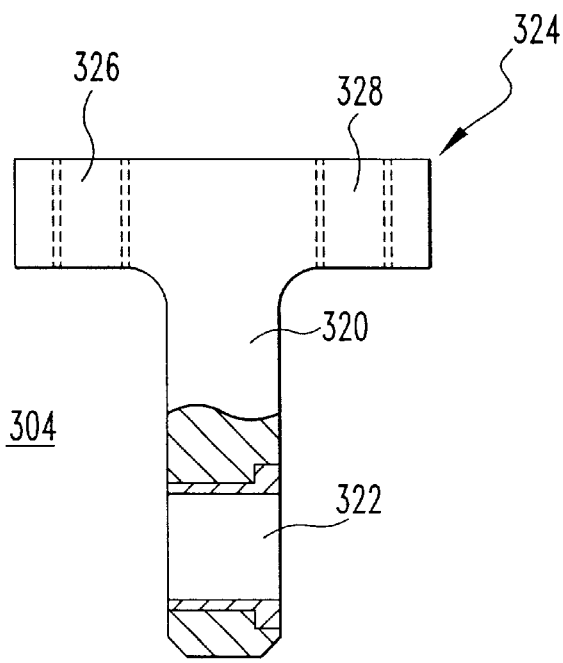
FIG. 10 is a partial cross-sectional view of the pin supports.

Support collar assembly 301 includes a collar 302, pin supports 304, 305, 306, 307, and pins 308, 309. As shown in FIG. 9, collar 302 is rectangular with an offset medial opening 310 therethrough, a push rod opening 312, and a plurality of fastener holes therethrough 314. As shown in FIGS. 7a and 7b, pin supports 304, 305, 306, 307 are disposed below the collar 302 held by fasteners 315 which are disposed within fastener holes 314. It is understood that, although not shown in the elevational views, pin support 306 is located adjacent to pin support 304. As shown in FIG. 10, each pin support 304, 305, 306, 307 has a flat body 320 with an pin opening 322 and a perpendicular mounting flange 324. The mounting flange 324 incorporates threaded fastener holes 326, 328 which cooperate with fasteners 315 to attach the pin supports 304, 305, 306, 307 below and to collar 302. When disposed below collar 302, the pin supports 304, 305, 306, 307 form pairs with aligned pin openings 322. Rotatable pins 308, 309 are disposed within each pair of pin supports 304, 305, 306, 307 passing through pin openings 322. Each pin 308, 309 has an axis of rotation 331, 333. Each pin 308, 309, is fixed to a linking member 282, 283 and to a latch member 290, 291.

Figure 11:
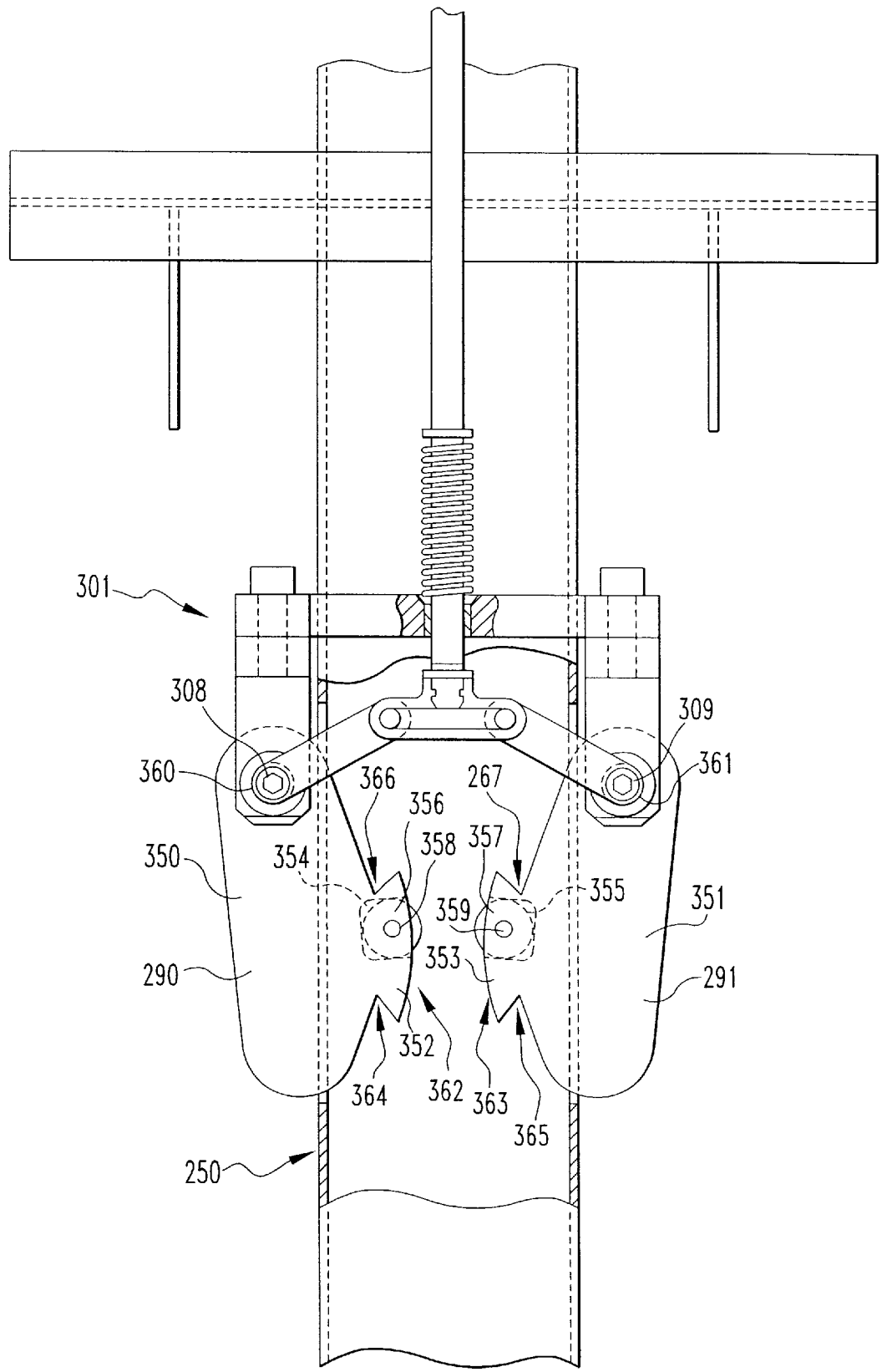
FIG. 11 is a detail view of the latch members.

In the preferred embodiment, as shown on FIG. 11, latch members 290, 291 are butterfly wing shaped plates 350, 351 having a tabs 352, 353, wheel cavities 354, 355, wheels 356, 357, axles 358, 359 and mounting holes 360, 361. Tabs 352, 353 are shaped with a convex outer edge 362, 363, with notches 364, 365, 366, 367 between outer edges 362, 363 and plates 350, 351. Wheel cavities 354, 355 are within either tab 352, 353. Wheels 356, 357 are disposed within either wheel cavity 354, 355 and held in place by either axle 358, 359. Wheels 356, 357 extend beyond outer edges 362, 363. Latch members 290, 291 are fixed to either pin 308, 309 and rotate about either axis 331 or 333. Latch members 290, 291 are attached to pins 308, 309 so that tabs 352, 353 are proximal to outer member 250 and so that latch members 290, 291 are disposed below collar assembly 301.

Referring again to FIGS. 7 and 8, interlock support plate 289 is rectangular having push rod opening 342. Interlock support plate 289 is disposed adjacent to the top of outer member 250 above collar assembly 301. Collar assembly 301 is disposed about outer member 250 above openings 258, 259. Collar assembly tab opening 312 and support plate tab opening 342 are aligned vertically. Push rod 286 is slidably disposed through collar assembly tab opening 312 and support plate tab opening 342. Push rod 286 has an upper end 950 and a lower end 351. A ball knob 952 is disposed at push rod upper end 950. Horizontal double clevis 284 is disposed at push rod lower end 351. Linking members 282, 283 are flat rectangular members having a pivot holes 360, 361 at one end and a pin mounting holes 362, 363 at the opposite end. Linking members 282, 283 are rotatably coupled about pivot holes 360, 361 to double clevis 284, one linking member 282, 283 on either side of the double clevis 284. As noted above, linking members 282, 283 are each fixedly attached to a pin 308, 309; this attachment is through pin mounting holes 362, 363. Push rod 286 has a flange 370 disposed at a location spaced above collar assembly 301. Spring 288 is a helical coil spring wrapped about push rod 286 and positioned between collar assembly 301 and flange 370, thus biasing push rod 286 upward.

Unless the shield device 420 is engaged (described below), the interlock device 280 engages the inner member 230 and outer member 250 in a similar fashion regardless of whether the inner member 230 is in its upper position 228 or its lower position 229. Accordingly, the following description shall address the operation of the interlock device 280 as if the inner member 230 is in its upper position 228 and tabs 352, 353 of latch members 290, 291 pass through inner member lower openings 262, 263. It is understood however that the following description is equally applicable to the operation of the interlock device 280 with the inner member upper openings 260, 261.

Figure 8:
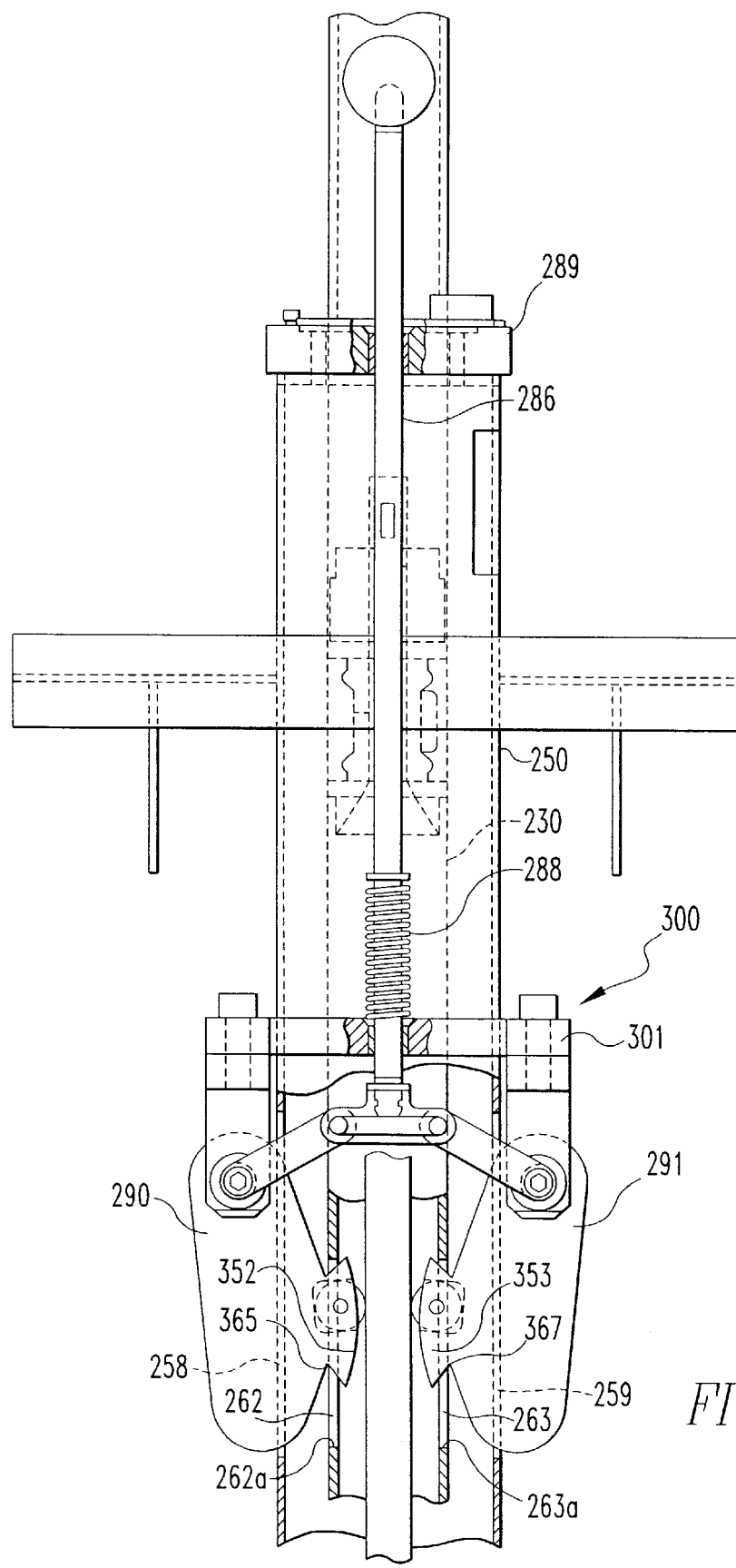
FIG. 8 is a cross-sectional view showing the interlock engaging the inner member.

As shown in FIG. 8, if crane 60 is lifting inner member 230 while tabs 352, 353 of latch members 290, 291 pass through inner member 230 lower openings 262, 263, inner member 230 will slide within outer member 250 until the lower edge 262a, 263a of lower openings 262, 263 contact notches 365, 367. When the lower edge 262a, 263a of lower openings 262, 263 contacts notches 365, 367, inner member 230 is prevented from sliding within outer member 250. At this point, raising the crane 60 will lift the entire transfer device 70 as the lifting force is transferred from inner member 230 through the interlock device 280 to outer member 250.

Figure 12A:
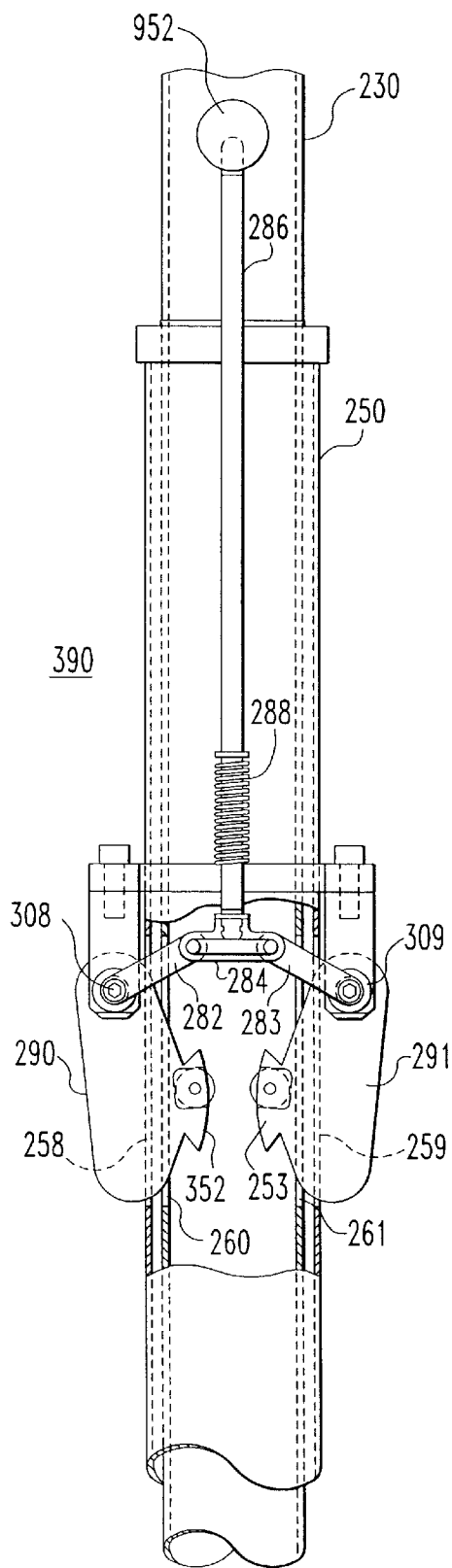
FIG. 12a shows the interlock in the upper, locked position.
Figure 12B:
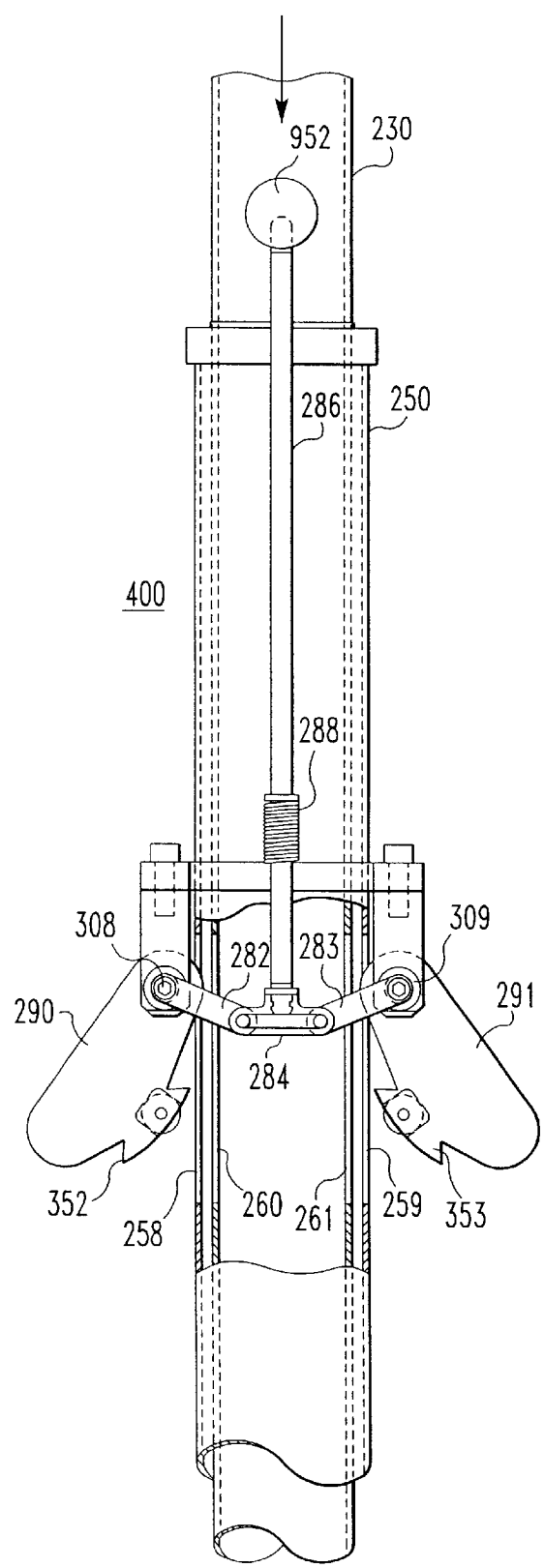
FIG. 12b shows the interlock in the lower, unlocked position.

As shown in FIG. 12A, in operation, as push rod 286 is biased upward by spring 288 into an upper position 390, push rod 286 lifts double clevis 284. Double clevis 284 in turn lifts linking members 282, 283. Linking members 282, 283 act upon either pin 308 or 309 which in turn act upon latch members 290, 291, biasing latch members 290, 291 toward outer member 250. Tabs 352, 353 of latch members 290, 291 pass through outer member openings 258, 259. Unless the shield device 420 is in place, as described below, when the inner member is in either its upper position 228 or its lower position 299, tabs 352, 353 of latch members 290, 291 also pass through either inner member 230 upper openings 260, 261, or lower openings 262, 263. Thus, when the push rod 286 is in its upper position 390 and the outer member openings 258, 259 are aligned with the inner member openings 260, 261 the latch members 290, 291 are in the locked position.

To release the interlock device 280 and allow the inner member 230 to slide within outer member 250, an operator must operate the release mechanism 300 by pressing ball knob 952 which will counter act the force of spring 288 acting on push rod 286 and lower push rod 286 into it lower position 400. When push rod 286 is in its lower position 400, push rod 286 lowers double clevis 284. Double clevis 284 in turn lowers linking members 282, 283. Linking members 282, 283 act upon either pin 308 or 309 which in turn act upon latch members 290, 291, rotating latch members 290, 291 away from outer member 250. Tabs 352, 353 of latch members 290, 291 are then removed from outer member 250 openings 258, 259 and either inner member 230 upper openings 260, 261, or lower openings 262, 263. Thus, when the push rod 286 is in its upper position 390 and the outer member openings 258, 259 are aligned with the inner member openings 260, 261 the latch members 290, 291 are in the locked position.

With the latch members 290, 291 in the unlocked position, inner member 230 can slide freely within outer member 250. As shown in FIG. 3b, as inner member 230 slides up or down within outer member 250, the inner member openings, either upper or lower, 260, 261, 262, 263, will no longer be aligned with outer member openings 258, 259. Instead, as inner member 230 is being raised or lowered, the outer surface 236 of inner member 230 is exposed through outer member openings 258, 259. Once the outer surface 236 of inner member 230 is exposed through outer member openings 258, 259 the operator may release ball knob 352 and allow latch members 290, 291 to be biased by spring 288 toward outer member 250. Wheels 356, 357 will now contact the outer surface 236 of inner member 230 allowing inner member 230 to slide between latch members 290, 291. When inner member 230 reaches either its upper position 228 or its lower position 229, the inner member openings, either upper or lower, 260, 261, 262, 263 will align with outer member openings 258, 259 and latch members 290, 291 will close, once again locking the inner member 230 within the outer member 250.

The interlock device 280 may be disabled by a shield device 420. Disabling the interlock device 280 is desirable when lifting a poison rod assembly 40 from a fuel cell 20. As will be described below, lifting of the poison rod assembly 40 is accomplished by coupling the poison rod assembly 40 to gripper assembly 210 located at the bottom of inner shaft 230. To engage gripper assembly 210 with the poison rod assembly 40, the inner member 230 must be lowered below its lower position 229. To lower inner member 230 below its lower position 229, the interlock device 280 must be disengaged. To prevent the interlock device 280 from re-engaging once inner member 230 returns to its lower position 229 as the poison rod assembly 40 is being lifted, a shield device 420 is used.

Figure 13:
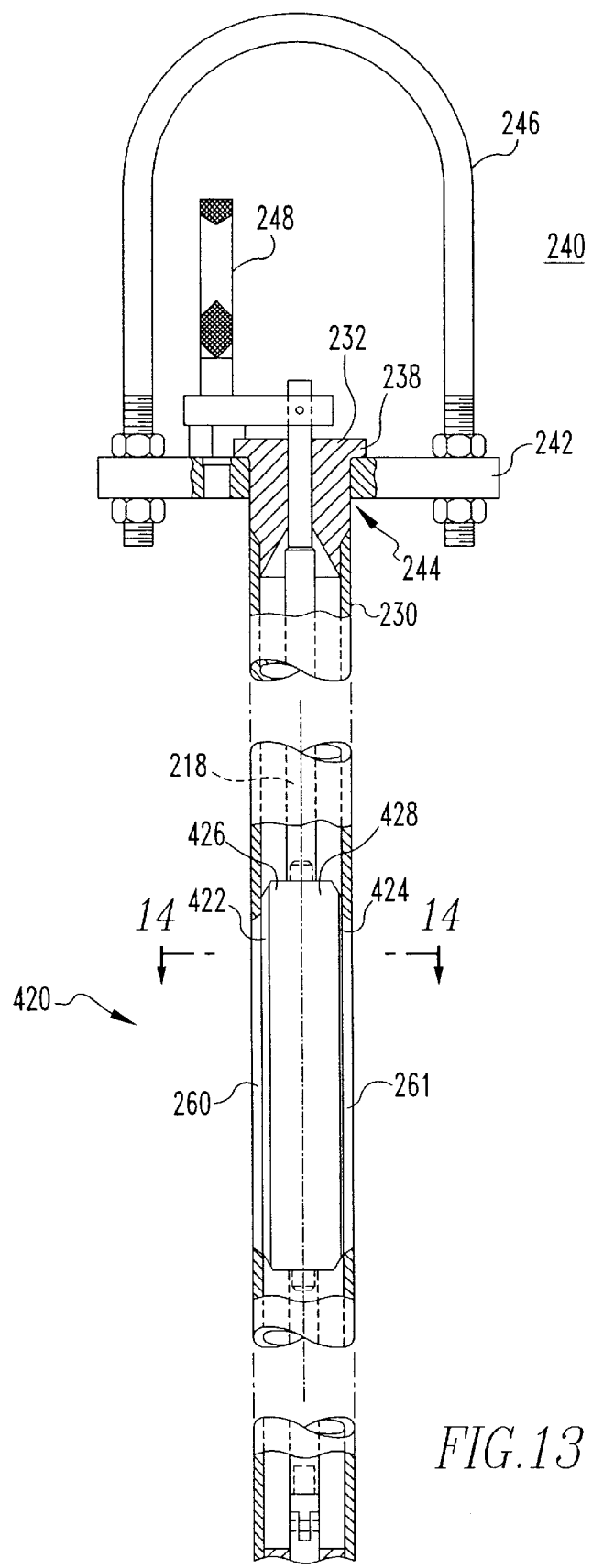
FIG. 13 is a cross-sectional view of the shield device.
Figure 14A:
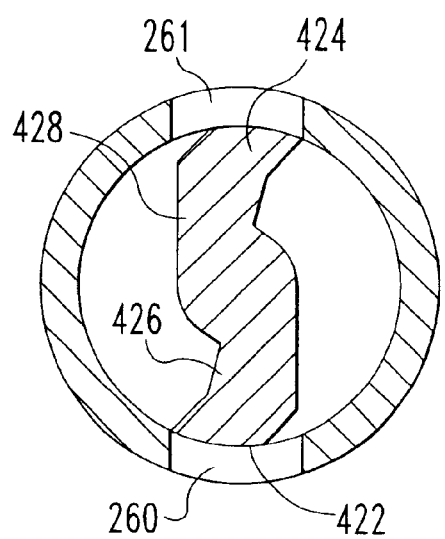
FIG. 14a shows the shield device engaged.
Figure 14B:
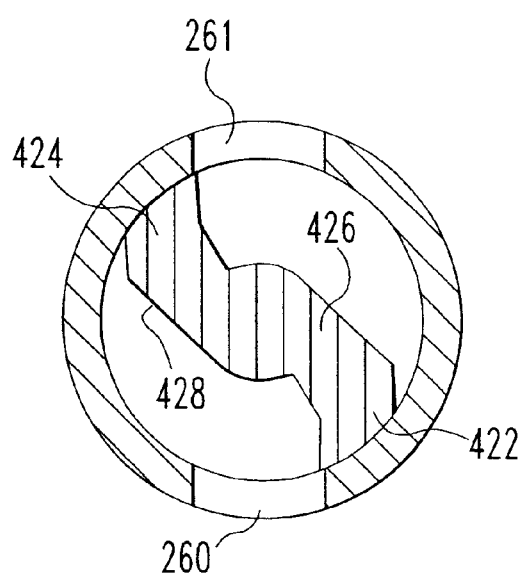
FIG. 14b shows the shield device released.

As shown in FIG. 13, the shield device 420 includes two arcuate shields 422, 424 and mounting arms 426, 428. Mounting arms 426, 428 are attached to inner shaft 218. Inner shaft 218 is rotatably disposed within inner member 230. As part of the lifting operation described below, inner shaft 218 is rotated to latch T-bar 46 in gripper assembly 210. Shields 422, 424 are attached to mounting arms 426, 428 and disposed within inner member 230 adjacent to inner member 230 upper openings 260, 261. Shields 422, 424 are sized to match inner member 230 upper openings 260, 261. As shown in FIGS. 14a and 14b, mounting arms 426, 428 position shields 422, 424 so that when gripper 210 is not latched on a poison rod assembly 40, the shields are rotated away from openings 260, 261 so that the shield device 420 is in an open position. When inner shaft 218 is rotated to latch gripper 210, shields 422, 424 are rotated across openings 260, 261. Thus, when a poison rod assembly 40 is latched in gripper 210 and inner member 230 raised, the shield device 420 is in a closed position, blocking openings 260, 261, preventing interlock device 280 from latching inner member 230 in the lower position 229.

Figure 15:
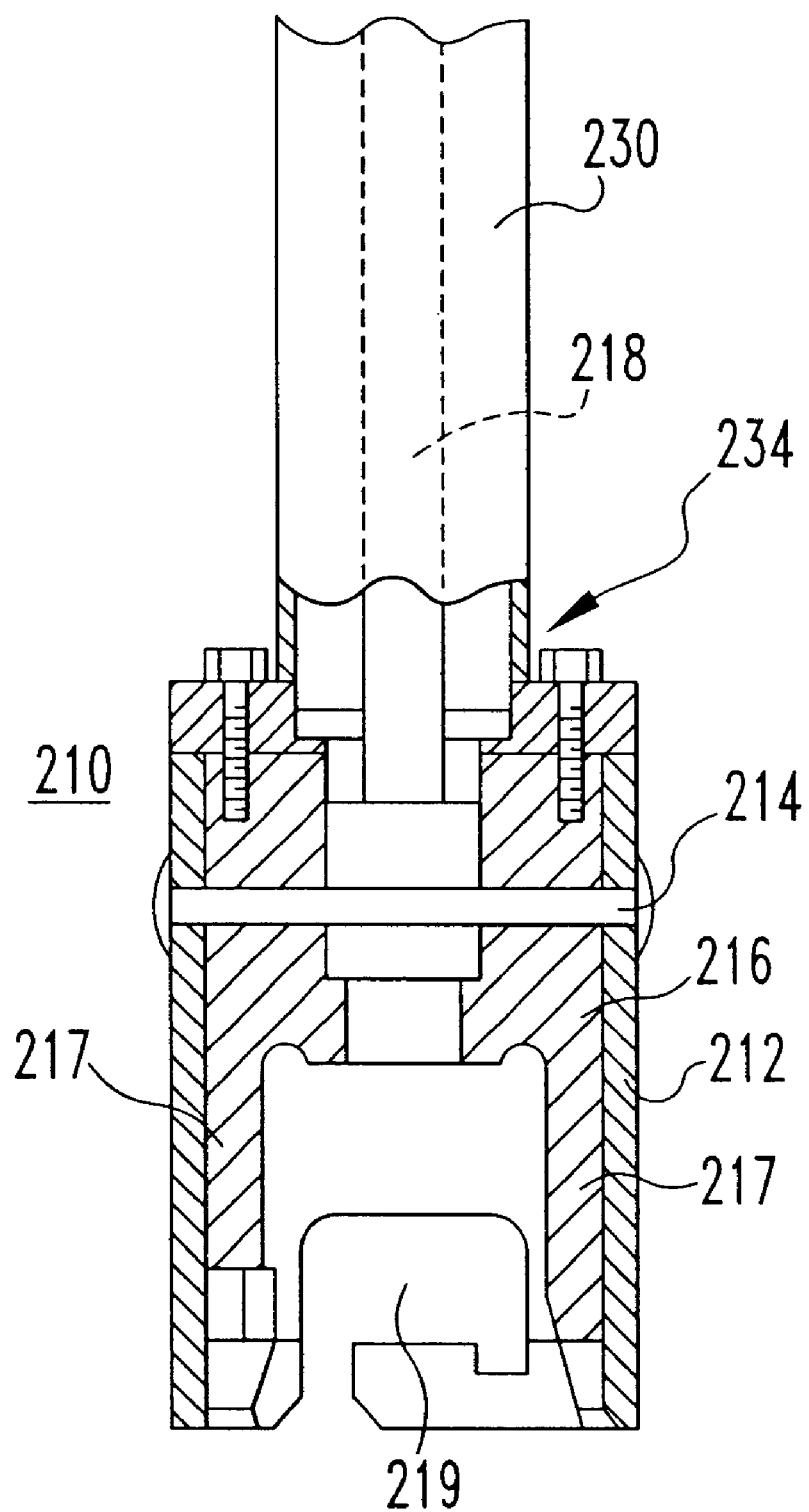
FIG. 15 is a partial cross-sectional view of the gripper assembly.

As shown in FIG. 15, coupling the poison rod assembly 40 to the transfer device 70 is accomplished by a gripper assembly 210 located at the bottom 234 of inner member 230 which can be rotated between an latched and an unlatched position. The gripper assembly 210 includes a gripper 212, a connecting pin 214, a base 216 and inner shaft 218. The gripper base 216 is a cylindrical member attached to inner member bottom 234, having a greater diameter than the inner member 230 and having two support fingers 217 extending downwardly from the base 216. The gripper base 216 provides support for the gripper 212 which is rotatably disposed about the gripper base 216. The gripper 212 incorporates two J-shaped notches 219 which are spaced approximately one hundred and eighty degrees apart. The J-shaped notches 219 are used to latch onto the T-bar 46 of the poison rod assembly 40. The gripper 212 is disposed on the gripper base 216 so that the J-shaped notches 219 are between support fingers 217. Inner shaft 218 is rotatably disposed within inner member 230 and extends from the bottom 234 of inner member 230 through the flange 238 located at the top of inner member 230. A connecting pin 214 connects the inner shaft 218 to the gripper 212. As shown in FIG. 6, a handle 248 is attached to the upper end of inner shaft 218 at lifting platform 240. When the gripper is positioned over a poison rod assembly 40 with T-bar 46 disposed within notch 219, the operator rotates handle 248 causing shaft 218 and, therefore, gripper 212 to rotate thereby latching T-bar 46 into J-shaped notches 219.

In operation, the transfer device 70 is seated on a fuel cell 20 as described above. At this time, inner member 230 in its lower locked position 229. The operator releases interlock device 280 and uses crane 60 to lower gripper assembly 210 onto the poison rod assembly 40. T-bar 46 will fit into the J-shaped notches 219. The operator then turns handle 248 rotating gripper 212 and latching T-bar 46 in the J-shaped notches 219. At the same time, shield device 420 rotates blocking inner member upper openings 260, 261. The operator then uses crane 60 to lift inner member 230, thereby raising gripper 212 and poison rod assembly 40 into frame cavity 88. Once inner member reaches its upper position 229, the interlock device 280 will engage. After the interlock device 280 has been engaged, raising crane 60 lifts the transfer device 70 off fuel cell 20. The operator then uses gantry 64 to reposition the transfer device over a different fuel cell 20. The transfer device 70 is then seated on the second fuel cell 20 as described above. Once the transfer device 70 is seated on the second fuel cell, the operator releases interlock device 280 and lowers crane 60 thereby lowering the poison rod assembly 40 into the new fuel cell 20.

After the poison rod assembly 40 is inserted into a second fuel cell 20, the operator turns handle 248 to unlatch the poison rod assembly 40 from gripper assembly 210. Simultaneously, shield device 420 will be withdrawn from inner member upper openings 260, 261. The operator then raises crane 60 to lift inner member 230 until the interlock device 280 engages upper openings 260, 261. Once the interlock device 280 is engaged, crane 60 may lift transfer device 70 off fuel cell 20.

While specific embodiments of the invention have been described in detail, it will be appreciated by those skilled in the art that various modifications and alternatives to those details could be developed in light of the overall teachings of the disclosure. Accordingly, the particular arrangement disclosed are meant to be illustrative only and not limiting as to the scope of the invention which is to be given the full breath of the appended claims and any and all equivalence thereof.

What is claimed is:

1. A transfer device for moving a poison rod assembly between fuel cells in a nuclear fuel storage facility coupleable to an overhead crane, said poison rod assembly having a plurality of poison rods disposed in rows, said device comprising:

an elongated outer member;

an inner member;

a gripper assembly supported by said inner member;

said inner member being slidably disposed within said elongated outer member;

said overhead crane coupled to said inner member for sliding said inner member between an upper position and a lower position relative to said elongated outer member;

an interlock assembly selectively coupling said inner member and elongated outer member whereby moving said crane coupled to said inner member moves both said inner member and said elongated outer member;

wherein said interlock assembly locks said inner member in said upper position when said inner member is brought into said upper position;

said gripper assembly includes an inner shaft rotatably disposed within and carried by said inner member;

said gripper coupled to said inner shaft;

wherein said gripper of said gripper assembly engages said poison rod assembly in a latched position and is disengagable from said poison rod assembly in an unlatched position; and wherein said gripper assembly is coupled to a shield assembly which blocks said interlock assembly from locking said inner member to said elongated outer member in said lower position of said inner member when said gripper is in said latched position.

2. The transfer device of claim 1, wherein said interlock assembly includes:

said elongated outer member having at least one opening;

said inner member having at least one lower opening aligned with said elongated outer member opening when said inner member is in said upper position;

at least one latch member passing through said elongated outer member at least one opening and engaging said inner member at least one opening in a locked position;

a release mechanism coupled to said at least one latch member for releasing said at least one latch member from said locked position.

3. The transfer device of claim 2, wherein said release mechanism includes a spring to bias said at least one latch member in said locked position.

4. The transfer device of claim 3, wherein said release mechanism moves said at least one latch member between said locked position and an unlocked position.

5. The transfer device of claim 4, wherein:

said elongated outer member has an upper end; and said release mechanism is disposed at said upper end of said elongated outer member.

6. The transfer device of claim 5, wherein said at least one latch member includes:

a member having a notch.

7. The transfer device of claim 6, wherein said inner member engages said notch when said at least one latch member is in said locked position.

8. The transfer device of claim 2, wherein said inner member has at least one upper opening, higher than said at least one lower opening said at least one upper opening aligned with said elongated outer member at least one opening when said inner member is in said lower position;

said upper opening coupleable to said at least one latch member when said inner member is in said lower position.

9. The transfer device of claim 8, wherein said interlock assembly further includes a shield device attached to said rotatable shaft adjacent to said inner member at least one lower opening;
  said shield device rotatable between a closed position corresponding to said latched position of said gripper assembly where said shield device blocks said inner member at least one upper opening and an open position corresponding to said unlatched position of said gripper assembly where said shield device does not block said inner member at least one upper opening.

10. A transfer device for moving a poison rod assembly between fuel cells in a nuclear fuel storage facility coupleable to an overhead crane, said poison rod assembly having a plurality of poison rods disposed in rows, said device comprising:
  an elongated outer member;
  an inner member;
  a gripper assembly supported by said inner member;
  said inner member being slidably disposed within said elongated outer member;
  said overhead crane coupled to said inner member for sliding said inner member between an upper position and a lower position relative to said elongated outer member;
  an interlock assembly selectively coupling said inner member and elongated outer member whereby moving said crane coupled to said inner member moves both said inner member and said elongated outer member;
  wherein said interlock assembly locks said inner member in said upper position when said inner member is brought into said upper position;
  wherein said gripper assembly includes:
    a gripper having J-shaped notches;
    an inner shaft rotatably disposed within and carried by said inner member;
  said gripper coupled to said inner shaft;
  wherein said gripper of said gripper assembly engages said poison rod assembly in a latched position and is disengagable from said poison rod assembly in an unlatched position.
  wherein gripper assembly is coupled to a shield assembly which blocks said interlock assembly from locking said inner member to said elongated outer member in said lower position of said inner member when said gripper is in said latched position.
  wherein said interlock assembly includes:
    said elongated outer member having at least one opening;
    said inner member having at least one lower opening aligned with said elongated outer member opening when said inner member is in said upper position;
  at least one latch member passing through said elongated outer member at least one opening and engaging said inner member at least one opening in a locked position;
  a release mechanism coupled to said at least one latch member for releasing said at least one latch member from said locked position;
  wherein said release mechanism includes a spring to bias said at least one latch member in said locked position;
  wherein said release mechanism moves said at least one latch member between said locked position and an unlocked position;
  said elongated outer member has an upper end;
  said release mechanism is disposed at said upper end of said elongated outer member;
  wherein said at least one latch member includes a member having a notch;
  wherein said inner member engages said notch when said at least one latch member is in said locked position;
  wherein said at least one latch member further includes:
    a tab having an arcuate surface, integral to said member;
    a wheel cavity in said tab;
    a wheel;
    an axle;
  said wheel disposed on said axle in said wheel cavity so that a portion of said wheel extends beyond said arcuate outer tab surface.

11. The transfer device of claim 10, wherein said release mechanism further includes:
  a collar disposed around said elongated outer member adjacent to said elongated outer member opening;
  said collar having a push rod opening;
  at least one pair of pin supports disposed below said collar;
  at least one rotatable pin disposed in said pin supports;
  said at least one latch attached to said at least one rotatable pin;
  a push rod having an upper end and a lower end, said push rod slidably disposed within said push rod opening;
  a spring disposed about said push rod biasing said push rod into an upper position;
  said push rod coupled to said at least one rotatable pin;
  wherein said push rod is slidable between an upper position corresponding to said locked position of said at least one latch member and a lower position corresponding to said unlocked position of said at least one latch member.

12. The transfer device of claim 11, wherein said release mechanism further includes:
  a clevis attached to said push rod lower end;
  at least one linking member having a pivot hole and a pin hole;
  said at least one linking member rotatably coupled at said pivot hole to said clevis and fixedly attached at said pin hole to said at least one pin.

13. The transfer device of claim 12, wherein said inner member has at least one upper opening, higher than said at least one lower opening, said at least one upper opening aligned with said elongated outer member at least one opening when said inner member is in said lower position;
  said at least one upper opening coupleable to said at least one latch member when said inner member is in said lower position.

14. The transfer device of claim 13, wherein said interlock assembly further includes a shield device attached to said rotatable shaft adjacent to said inner member at least one upper opening;
  said shield device rotatable between a closed position corresponding to said latched position of said gripper assembly where said shield device blocks said inner member at least one upper opening and an open position corresponding to said unlatched position of said gripper assembly where said shield device does not block said inner member at least one upper opening.

* * * * *